(12) United States Patent
Tamura

(10) Patent No.: US 9,708,968 B2
(45) Date of Patent: Jul. 18, 2017

(54) CARBURETOR FOR TWO-STROKE INTERNAL COMBUSTION ENGINE

(71) Applicant: ZAMA JAPAN KABUSHIKI KAISHA, Iwate (JP)

(72) Inventor: Mineyuki Tamura, Iwate (JP)

(73) Assignee: ZAMA JAPAN KABUSHIKI KAISHA, Iwate (JP)

(*) Notice: Subject to any disclaimer, the term of this patent is extended or adjusted under 35 U.S.C. 154(b) by 85 days.

(21) Appl. No.: 14/728,672

(22) Filed: Jun. 2, 2015

(65) Prior Publication Data

US 2016/0356204 A1 Dec. 8, 2016

(51) Int. Cl.
| F02M 9/00 | (2006.01) |
| F02B 25/22 | (2006.01) |
| F02M 9/08 | (2006.01) |
| F02B 17/00 | (2006.01) |
| F02B 25/02 | (2006.01) |
| F02M 7/24 | (2006.01) |
| F02M 23/00 | (2006.01) |

(52) U.S. Cl.
CPC .............. *F02B 25/22* (2013.01); *F02B 17/00* (2013.01); *F02B 25/02* (2013.01); *F02M 7/24* (2013.01); *F02M 9/08* (2013.01); *F02M 23/00* (2013.01)

(58) Field of Classification Search
CPC ............... F02M 7/24; F02M 9/00; F02M 9/08
USPC .......... 261/23.3, 44.8, 64.1, DIG. 1
See application file for complete search history.

(56) References Cited

U.S. PATENT DOCUMENTS 6,481,699 B1* 11/2002 Aihara .................... F02M 7/08
261/34.2
7,722,015 B2* 5/2010 Koizumi .................. F02M 9/08
123/73 PP

FOREIGN PATENT DOCUMENTS

JP 2000-352354 12/2000
JP 2014-105628 6/2014

* cited by examiner

*Primary Examiner* — Robert A Hopkins
(74) *Attorney, Agent, or Firm* — One LLP

(57) ABSTRACT

A carburetor for a two-stroke internal combustion engine whereby airtightness is maintained and intake of uncombusted fuel into an air path is prevented. The carburetor includes a circular cylindrical valve hole and a rotary valve fitted into the valve hole such that it can rotate and is disposed perpendicularly across a fuel intake path and an air intake path which are formed substantially parallel with respect to each other, and a fuel supply-side bore which controls the flow rate along the fuel intake path and the air supply-side bore which controls the air capacity along the air path pass through part of the cylindrical portion perpendicularly to the axial direction of the rotary valve, and annular recesses formed in part of a circumferential wall of an outer circumference of the rotary valve so as not to correspond to at least the fuel supply-side bore and the air supply-side bore.

6 Claims, 4 Drawing Sheets

CARBURETOR FOR TWO-STROKE INTERNAL COMBUSTION ENGINE

BACKGROUND OF THE INVENTION

Field of the Invention

The present invention relates to a carburetor for a stratified scavenging engine suitable for a two-stroke internal combustion engine.

Background Art

Conventionally, in two-stroke internal combustion engines, a gaseous mixture, which has been pressurized in a crank chamber, is supplied to a combustion chamber of a cylinder through a scavenging hole, thereby scavenging combusted gas remaining in the combustion chamber of the cylinder.

To improve scavenging of the combustion gas, the gaseous mixture which has flowed into the combustion chamber is emitted into the atmosphere through the emission hole together with the combusted gas, a phenomenon called blow-by, and this increases the amount of uncombusted components in gas emissions, which is a waste of fuel.

Blow-by can be controlled by closing the emission hole earlier with the piston, but that simply increases the amount of combusted gas remaining in the combustion chamber of the cylinder, leading to imperfect combustion, which not only increases the amount of hydrocarbons in the gas emissions, but also reduces the overall output of the two-stroke internal combustion engine.

Accordingly, one known method for solving this problem is an engine wherein during the scavenging step of the two-stroke internal combustion engine leading air, which is introduced beforehand into a scavenging path or the like, and the gaseous mixture which follows flow into the cylinder in stratified layers from the scavenging port, which prevents uncombusted gas from flowing out of the emission port (i.e., blow-by) (a stratified scavenging two-stroke internal combustion engine).

With the carburetor connected to this stratified scavenging two-stroke internal combustion engine, when the crank chamber is in a negative pressure state when the piston is up, the gaseous mixture controlled by a rotary fuel control valve is drawn into the crank chamber through the intake hole while at the same time air controlled by a rotary air control valve is drawn from the air path into the scavenging path via a check valve.

When the gaseous mixture explodes the piston drops, the emission hole opens when the piston is at bottom dead center, the combusted gas is emitted, and then the scavenging hole opens, the air in the scavenging path is injected into the combustion chamber of the cylinder by the positive pressure in the crank chamber, and then the gaseous mixture in the crank chamber is injected into the combustion chamber.

While the emission hole is open, the air initially injected into the combustion chamber of the cylinder through the scavenging hole flows out to the emission hole, and the emission hole remains closed until the gaseous mixture flows to the emission hole.

Thus, in a two-stroke internal combustion engine to which the aforementioned carburetor is attached, only the air is scavenged, making it possible to control blow-by of the gaseous mixture.

However, in the case of a carburetor (FIG. 5) which is connected to a typical two-stroke internal combustion engine using a rotary valve as shown in FIG. 6, the fuel intake path and the air path are disposed in parallel, the rotary valve which is used in flow rate control in these paths is disposed so as to pass perpendicularly through the fuel intake path and the air path, allowing coaxial adjustment of the flow rate along both the fuel intake path and the air path by the rotary valve. This makes it difficult to establish airtightness between the fuel intake path and the air path independently of one another. When the negative pressure from the two-stroke internal combustion engine acts inside the carburetor, part of the fuel in the fuel intake path is drawn into the air path through a gap between the rotary valve and the valve hole, preventing stable supply of air and fuel and rendering performance of the internal combustion engine unstable, which is a factor causing the engine to stall.

Relative to this problem, JP 2000-352354 A discloses a carburetor for a two-stroke internal combustion engine whereby the negative pressures from the two stroke internal combustion engine which acts on the rotary fuel control valve and the rotary air control valve do not interfere with one another in the carburetor.

Specifically, by disposing a sealing member between the outer circumference of the rotary air control valve and the cylindrical portion into which the rotary air control valve is inserted, or between the outer circumference of the rotary fuel control valve and the cylindrical portion into which the rotary fuel control valve is inserted, and maintaining airtightness between the fuel intake path and the air path, interference between the negative pressure from the two-stroke internal combustion engine acting on the rotary fuel control valve and the rotary air control valve can be prevented inside the carburetor.

On the other hand, a method whereby a sealing member maintains airtightness with the outer circumference of the cylindrical portion of the rotary air control valve and the rotary fuel control valve is very effective in terms of maintaining airtightness of the paths, but since the sealing member needs to be disposed, the number of parts needed for the carburetor increases, which causes the cost to rise. Moreover, as a result of continuous use, the sealing member wears down and swells, which can become a factor in malfunctions due to a drop in airtightness.

SUMMARY OF THE INVENTION

Accordingly, the present invention solves these problems and provides a carburetor for a two-stroke internal combustion engine whereby intake of uncombusted fuel into an air path can be prevented without increasing the number of parts.

To solve this problem, the present invention is directed to a carburetor for a two-stroke internal combustion engine which is provided with a bottom-having circular cylindrical valve hole formed substantially in the middle of a carburetor unit and a rotary valve which is fitted into the valve hole such that a circular cylindrical portion thereof can rotate, wherein the rotary valve is disposed so as to perpendicularly cross a fuel intake path and an air intake path which are formed substantially parallel with respect to each other in the carburetor, and a fuel supply-side bore which controls the flow rate along the fuel intake path and the air supply-side bore which controls the air capacity along the air path pass through part of the cylindrical portion perpendicularly to the axial direction of the rotary valve, wherein an annular recess is formed at least in part of a circumferential wall of an outer circumference of the cylindrical portion of the rotary valve so as not to correspond to the fuel supply-side bore and the air supply-side bore.

Furthermore, the present invention is such that the annular recess is provided to an outer circumferential portion of the rotary valve between the fuel supply-side bore and the air supply-side bore formed in the rotary valve.

Furthermore, the present invention is such that the annular recess is provided to at least part of a top end or a base end of the rotary valve.

Furthermore, the annular recess is formed between the fuel supply-side bore and the air supply-side bore formed in the circumferential wall of the bottom-having circular cylindrical inner circumference of the valve hole, thereby making it possible to prevent intake of uncombusted fuel into the air path.

Specifically, the annular recess is provided to at least a position between the fuel supply-side bore and the air supply-side bore in the circumferential wall of the bottom-having cylindrical inner circumference of the valve hole, or in a part of the top end or the base end of the circumferential wall of the bottom-having cylindrical inner circumference of the valve hole.

By providing the annular recess to part of the outer circumference of the rotary valve in the carburetor for the two-stroke internal combustion engine of the present invention as described above, it is possible to easily prevent inflow of fuel from the fuel intake path without concomitantly increasing the number of parts.

BRIEF DESCRIPTION OF THE DRAWINGS

FIG. 2-1 is a frontal view of a rotary valve according to the present invention.

FIG. 2-2 is a partial cross-sectional frontal view of a rotary valve according to the present invention.

DESCRIPTION OF THE PREFERRED EMBODIMENTS

A detailed description of a preferable mode for carrying out the present invention is given below.

Figure 5:
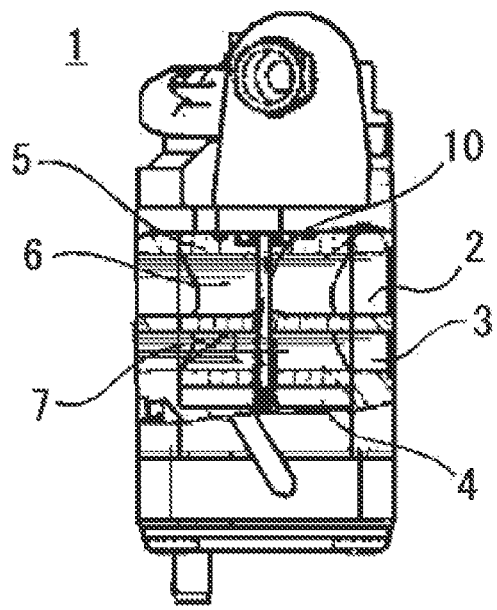
FIG. 5 is a total cross-sectional view of a carburetor for a typical stratified scavenging two-stroke internal combustion engine.

FIG. 5 is a partial cross-sectional view of a carburetor for a typical two-stroke internal combustion engine. A carburetor unit 1 is such that a rotary valve 5 is rotatably fitted into a valve hole 4 substantially in the center, and an air path 2 and a fuel intake path 3 are disposed vertically parallel to one another and perpendicular the axis of the rotary valve 5.

Figure 6:
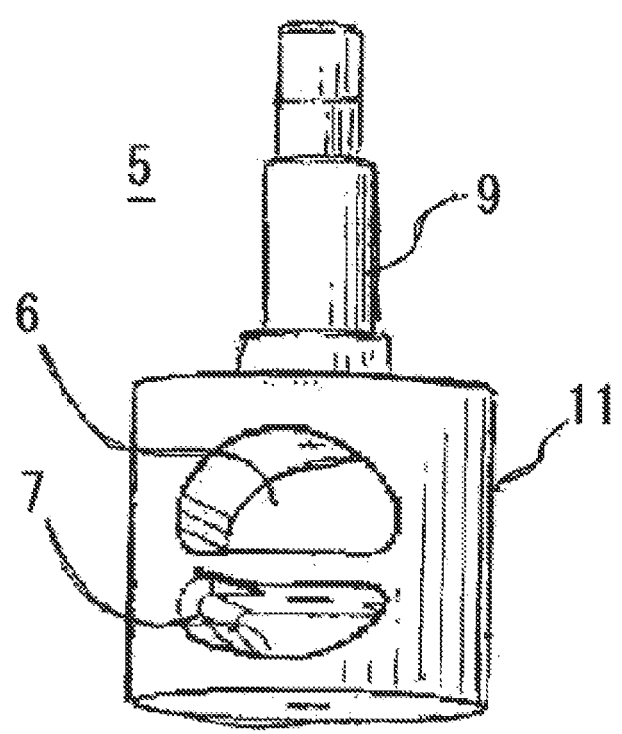
FIG. 6 is an oblique view of a conventional rotary valve.

When the rotary valve 5 rotates around a throttle shaft 9 (FIG. 6), the aperture area of an air supply-side bore 6 and a fuel supply-side bore 7 is changed, which adjusts the amount of air and fuel flowing through the air path 2 and the fuel intake path 3, the state of the two-stroke internal combustion engine thereby being adjusted to match the driving mode.

Figure 1:
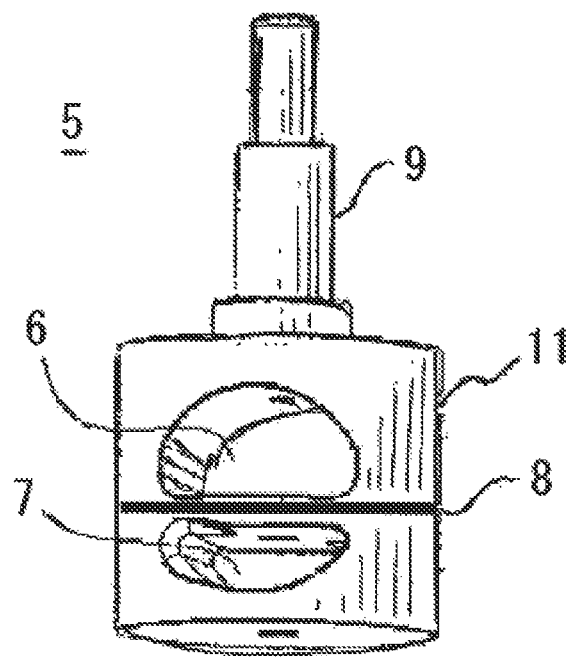
FIG. 1 is an oblique view of a rotary valve according to the present invention.

As shown in FIG. 1, the rotary valve 5 according to the present invention is a circular cylindrical valve inserted rotatably into the valve hole 4 and having the same diameter as it, provided with the throttle shaft 9 axially attached to a top end of the cylindrical portion 11. In the cylindrical portion 11, the air supply-side bore 6 which communicates with the air path 2 and the fuel supply-side bore 7 which communicates with the fuel intake path 3 are disposed vertically parallel to one another in a tunnel-like formation vertically with respect to the axial direction of the throttle shaft 9.

An annular recess 8 is formed on an outer wall of the cylindrical portion 11 between the fuel supply-side bore 7 and the air supply-side bore 6.

Figures 1, 2:
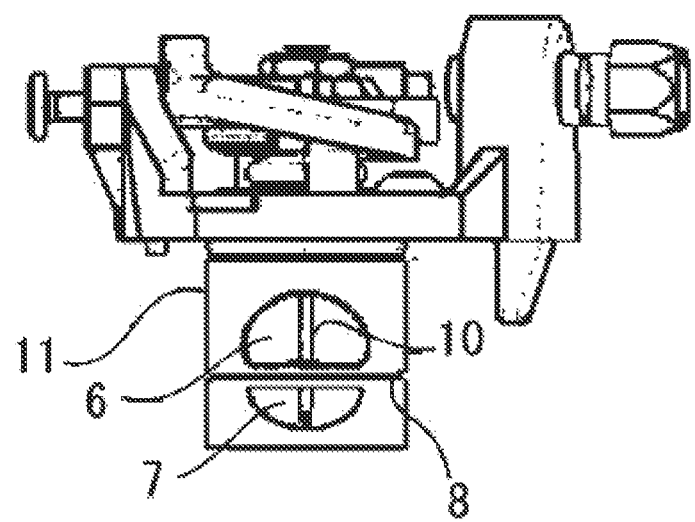
Figure 2:
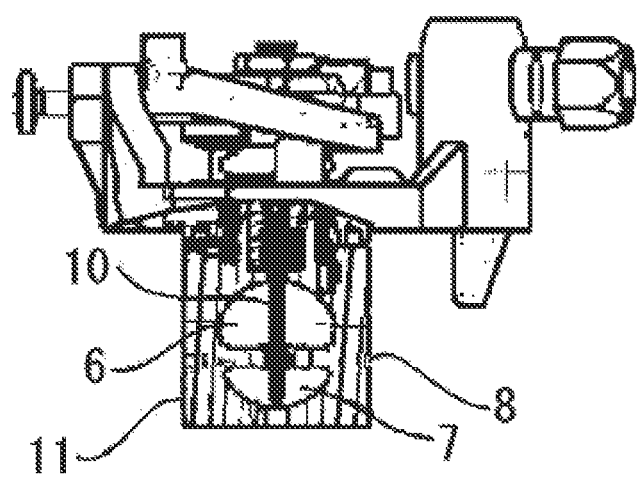

As shown in FIGS. 2-1 and 2-2, the rotary valve 5 is formed substantially in the middle of the carburetor unit 1 and a needle 10 for adjusting the fuel supply is formed inside the throttle shaft 9 of the rotary valve 5.

Figure 3:
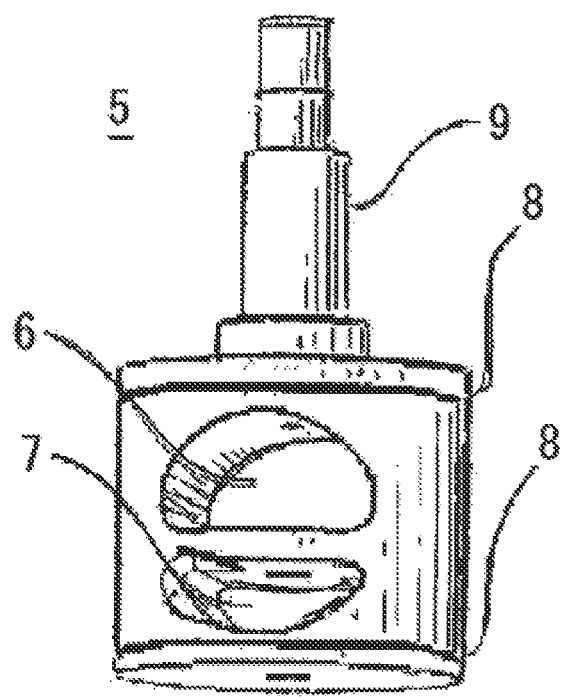
FIG. 3 is another embodiment of a rotary valve according to the present invention.

As another embodiment shown in FIG. 3, the annular recess 8 is provided in two places, to the top and bottom of the rotary valve 5. If it is formed at least on the top end or the base end of the rotary valve 5, this would be effective for preventing intake of fuel into the air supply-side bore 6 from the gap between the carburetor unit 1 and the rotary valve 5, which would make it possible to achieve appropriate adjustment, taking into account the size and location of the carburetor incorporating the rotary valve according to the present invention.

By providing the annular recess 8 to part of the outer circumference of the rotary valve of the two-stroke internal combustion engine, which is the present embodiment, even if fuel remaining in the fuel intake path is drawn up along the outer wall of the rotary valve from the gap between the rotary valve and the valve hole by the negative pressure in the engine, the presence of the annular recess 8 can prevent the fuel from entering the air path.

Moreover, by constituting the recess so as to be ring-shaped, the fuel can be thoroughly prevented from entering the air path, no matter where in the outer wall of the rotary valve 5 it leaks from.

Figure 4:
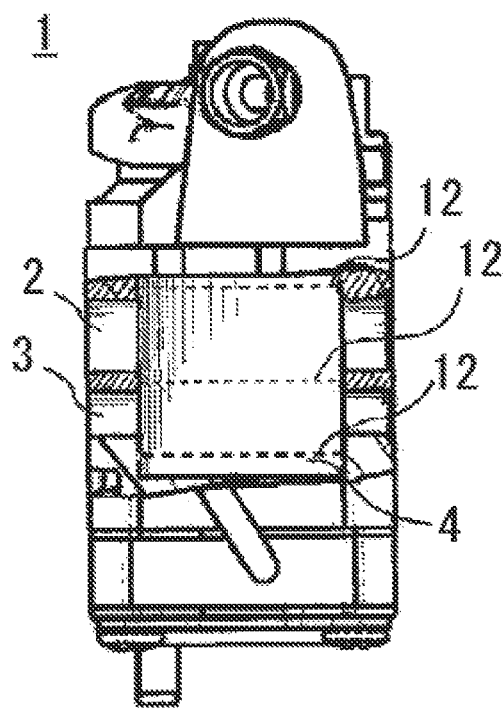
FIG. 4 is an embodiment wherein an annular recess is provided to a valve-hole side of the rotary valve.

FIG. 4 is an embodiment in which an annular recess 12, indicated by the dotted line, is provided to part of an inner circumferential wall of the valve hole 4 into which the rotary valve 5 is fitted. In other words, the groove is not provided to the rotary valve 5, but rather to the inner circumferential wall of the valve hole 4.

In the present embodiment, the annual recess 12 is provided to the inner circumferential wall of the valve hole 4 at a position corresponding to the annular recess 8 on rotary valve shown in FIG. 1 or FIG. 3, which provides the same effect as providing the annular recess to the rotary valve.

Note that if the groove is provided to at least the top, bottom, or middle of the valve hole 4, this has the same effect in terms of preventing intake of fuel into the air supply-side bore 6 from between the carburetor unit 1 and the rotary valve 5, and therefore the valve hole 4 of carburetor for a two-stroke internal combustion engine according to the present embodiment is provided with the annular recess 12 to one part of its inner circumference, which means that even if fuel which remains in the fuel intake path is drawn up along the outer wall of the rotary valve from between the rotary valve and the valve hole by the negative pressure in the engine, the present of the annular recess 12 can prevent entry of fuel into the air path.

By forming the recess in an annular shape, entry of fuel into the air path can be prevented thoroughly no matter where on the outer wall of the rotary valve 5 the fuel leaks from.

Thus, as discussed above, the present invention has as an object to prevent inflow of part of the fuel from between the rotary valve 5 and the carburetor 1 in a two-stroke internal combustion engine into an air supply-side bore 6, and can therefore thoroughly prevent intake of fuel without a concomitant increase in the number of members, such as a sealing member, or other parts.

All features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Express recitation of every possible combination and substitution is overly burdensome, especially given that the permissibility of each and every such combination and substitution will be readily recognized by those of ordinary skill in the art upon reading this description.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

KEY

1 Carburetor
2 Air path
3 fuel intake path
4 Valve hole
5 Rotary valve
6 Air supply—side bore
7 fuel supply—side bore
8 Annular recess
9 Throttle shaft
10 Needle
11 Cylindrical part
12 Annular recess

The invention claimed is:

1. A carburetor for a two-stroke internal combustion engine comprising a circular cylindrical valve hole formed substantially in the middle of a carburetor unit and a rotary valve which is fitted into the valve hole such that a circular cylindrical portion thereof can rotate, wherein the rotary valve is disposed so as to perpendicularly cross a fuel intake path and an air intake path which are formed substantially parallel with respect to each other in the carburetor, and a fuel supply-side bore which controls the flow rate along the fuel intake path and the air supply-side bore which controls the air capacity along the air path pass through part of the cylindrical portion substantially perpendicularly to the axial direction of the rotary valve, wherein an annular recess is formed in part of a circumferential wall of an outer circumference of the cylindrical portion of the rotary valve so as not to correspond to the fuel supply-side bore and the air supply-side bore.

2. The carburetor for a two-stroke internal combustion engine as claimed in claim 1, wherein the annular recess is provided between the fuel supply-side bore and the air supply-side bore formed in the rotary valve.

3. The carburetor for a two-stroke internal combustion engine as claimed in claim 1, wherein the annular recess is provided to at least part of a top end or a base end of the rotary valve.

4. A carburetor for a two-stroke internal combustion engine comprising a circular cylindrical valve hole formed substantially in the middle of a carburetor unit and a rotary valve which is fitted into the valve hole such that a circular cylindrical portion thereof can rotate, wherein the rotary valve is disposed so as to perpendicularly cross a fuel intake path and an air intake path which are formed substantially parallel with respect to each other in the carburetor, and a fuel supply-side bore which controls the flow rate along the fuel intake path and the air supply-side bore which controls the air capacity along the air path pass through part of the cylindrical portion substantially perpendicularly to the axial direction of the rotary valve, wherein an annular recess is formed in part of a circumferential wall of an inner circumference of the valve hole so as not to correspond to the fuel supply-side bore and the air supply-side bore.

5. The carburetor for a two-stroke internal combustion engine as claimed in claim 4, wherein the annular recess is provided between the fuel supply-side bore and the air supply-side bore formed in the circumferential wall of the inner circumference of the valve hole.

6. The carburetor for a two-stroke internal combustion engine as claimed in claim 4, wherein the annular recess is provided to at least part of a top end or a base end of the circumferential wall of the inner circumference of the valve hole.

* * * * *